United States Patent
Yanagihara

(10) Patent No.: US 7,791,538 B2
(45) Date of Patent: Sep. 7, 2010

(54) LOCATION ESTIMATION METHOD AND SYSTEM, AND WIRELESS DEVICE

(75) Inventor: Kentarou Yanagihara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 100 days.

(21) Appl. No.: 12/219,039

(22) Filed: Jul. 15, 2008

(65) Prior Publication Data
US 2009/0046013 A1    Feb. 19, 2009

(30) Foreign Application Priority Data
Aug. 16, 2007  (JP)  ............... 2007-212198

(51) Int. Cl.
G01S 3/02  (2006.01)
(52) U.S. Cl. ................. 342/451; 342/463
(58) Field of Classification Search ........... 342/451, 342/453, 458, 463; 455/456.1, 456.2, 456.6
See application file for complete search history.

(56) References Cited

U.S. PATENT DOCUMENTS 6,473,038 B2   10/2002   Patwari et al.
2008/0220780 A1 *  9/2008  Huseth et al. ............ 455/436
2009/0073043 A1 *  3/2009  Nozaki ...................... 342/450

FOREIGN PATENT DOCUMENTS

JP   2005-507070   3/2005
JP   2006-329688  12/2006

* cited by examiner

Primary Examiner—Dao L Phan
(74) Attorney, Agent, or Firm—Rabin & Berdo, P.C.

(57) ABSTRACT

A location estimation system in which the location of a target device is estimated from the known locations of a set of anchor devices and information obtained from wireless signals transmitted between the target device and the anchor devices. The estimation process makes use of parameters indicating propagation characteristics of the wireless signals. When the location of the target device has been estimated, new values are estimated for the parameters, based on the estimated location of the target device. The new parameter values are then used to estimate the location of the target device again. The location estimation and parameter estimation process is iterated until a predetermined condition is satisfied.

20 Claims, 5 Drawing Sheets

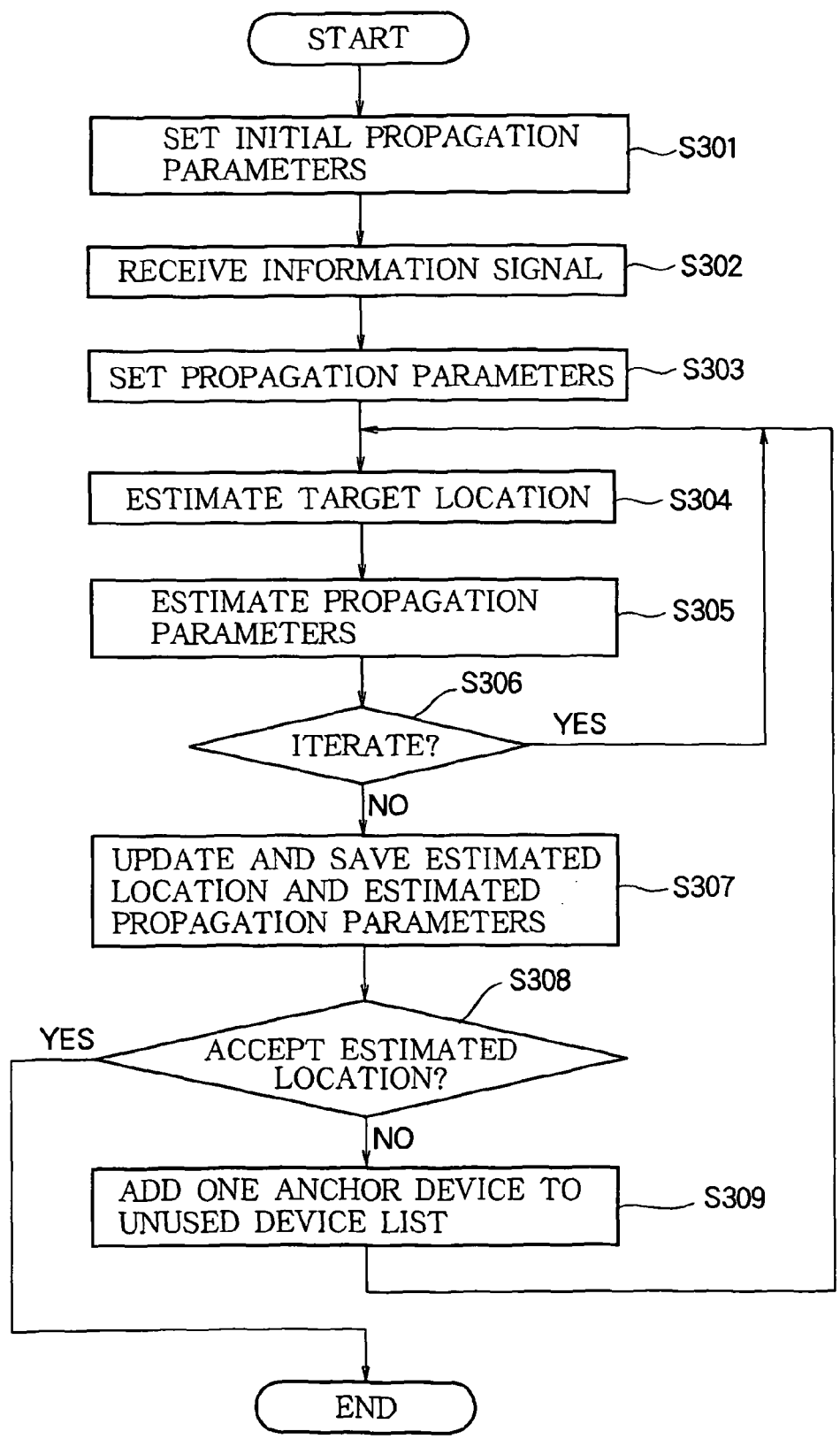

LOCATION ESTIMATION METHOD AND SYSTEM, AND WIRELESS DEVICE

BACKGROUND OF THE INVENTION

1. Field of the Invention

The present invention relates to a method and system for estimating the location of a wireless device, more particularly to a method of inexpensively improving the accuracy of the estimation.

2. Description of the Related Art

Estimating the location of a target device from the known locations of a plurality of anchor devices on the basis of the strengths of wireless signals transmitted and received by these devices is a known art. The estimation process makes use of a set of parameters such as propagation coefficients and correction coefficients describing signal propagation characteristics in the location estimation area. These parameters can be used to calculate distances from the target device to the anchor devices, or to model expected signal strengths at different locations and optimize the model by finding the location that best matches the actual received signal strengths.

For example, a system disclosed in U.S. Pat. No. 6,473,038 to Patwari et al. (and in corresponding Japanese Patent Application Publication No. 2005-507070) determines the unknown locations of a plurality of devices by measuring signals sent among these devices and signals sent between these devices and devices having known locations. The measurements are input to a graph function with a plurality of first sub-expressions and a plurality of signal measurement estimation sub-expressions having extrema when predicted signal measurements are equal to the actual signal measurements, and the graph function is optimized.

A problem with such systems is that the signal propagation parameters may vary greatly within the location estimation area. Outdoor and indoor signal propagation environments, for example, have different parameters, and the parameters of indoor environments also differ depending on room size and shape, ceiling height, wall, ceiling, and floor materials, and the presence of furniture and other paraphernalia. Even within a single room, the propagation parameters may vary from place to place, or from time to time as doors are opened and shut and people and objects enter, leave, or move around. All of these factors reduce the accuracy of conventional location estimation systems that model the location estimation area as a uniform plane with constant propagation parameters.

This problem can be partly overcome by dividing the plane into sub-areas, as proposed in Japanese Patent Application Publication No. 2006-329688, for example, and using different parameters for each sub-area. This scheme becomes costly, however, because it requires anchor devices to be installed in each sub-area. Moreover, it still relies on the unrealistic assumption that each sub-area is a uniform space with constant propagation parameters. A further problem is the additional computation needed to determine the sub-area in which the target device is located.

SUMMARY OF THE INVENTION

An object of the present invention is to provide an inexpensive method and system that can accurately estimate the location of a wireless device in an area with varying signal propagation characteristics.

Another object is to provide a wireless device employing the invented method.

The invented method estimates the location of a target device by using a parameter indicating a signal propagation characteristic of a location estimation area in which the target device and a plurality of anchor devices transmit and receive wireless signals. The locations of the anchor devices are known.

The method begins by using the parameter to determine an estimated location of the target device, based on the known locations of the anchor devices and on necessary information obtained from the wireless signals transmitted between the target device and the anchor devices.

Next, the method estimates a new value of the parameter based on the same necessary information, the known locations of the anchor devices, and the estimated location of the target device.

These processes may be iterated, using the new value of the parameter obtained in one iteration to estimate the location of the target device in the next iteration. The accuracy of the estimated location is thereby improved.

The new parameter value is used as an initial value in a subsequent location estimation of the same or another target device.

By re-estimating the parameter value after each new location estimation, the invention can adapt continuously and automatically to spatial and temporal variations in signal propagation conditions, without requiring the location estimation area to be divided into sub-areas.

The invention also provides a location estimation system including the target and anchor devices and a location estimation apparatus that employs the invented method to estimate the location of the target device.

The invention furthermore provides a wireless device including the location estimation apparatus.

BRIEF DESCRIPTION OF THE DRAWINGS

In the attached drawings:

FIG. 7 is a flowchart illustrating the location estimation operation in a third embodiment.

DETAILED DESCRIPTION OF THE INVENTION

Figure 1:
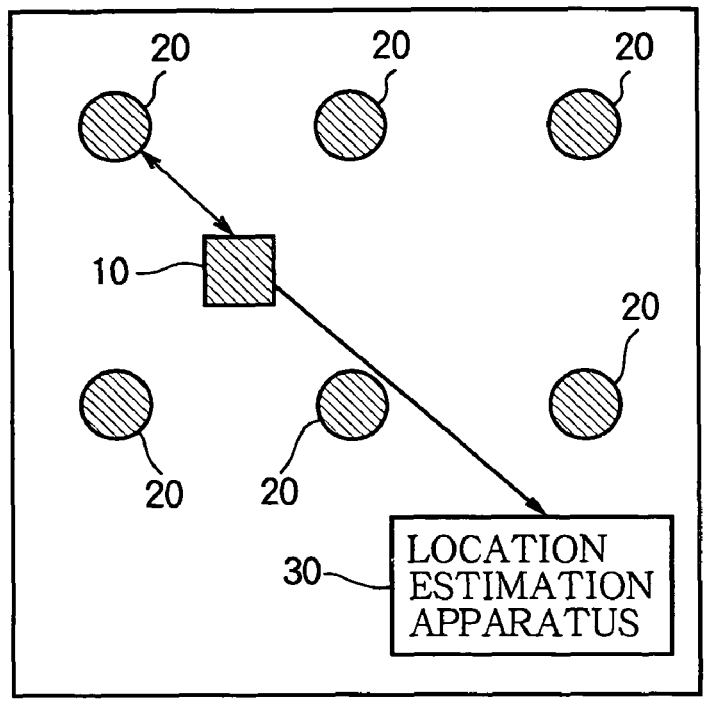
FIG. 1 illustrates the structure of the location estimation system in a first embodiment of the invention.

Embodiments of the invention will now be described with reference to the attached drawings, in which like elements are indicated by like reference characters.

First Embodiment

Referring to FIG. 1, the location estimation system in the first embodiment comprises a target device 10 deployed at an unknown location, a plurality of anchor devices 20 deployed at known locations, and a location estimation apparatus 30 for estimating the location of the target device 10 from necessary information obtained from wireless signals transmitted between the target device 10 and anchor devices 20.

The necessary information is obtained by the target device 10 or anchor devices 20, or both, and transmitted to the location estimation apparatus 30. The necessary information may include information from which the distance between the transmitting and receiving devices can be estimated, such as information indicating received signal power or signal delay. In the description given below, it will be assumed that the necessary information includes the received signal power.

Figure 2:
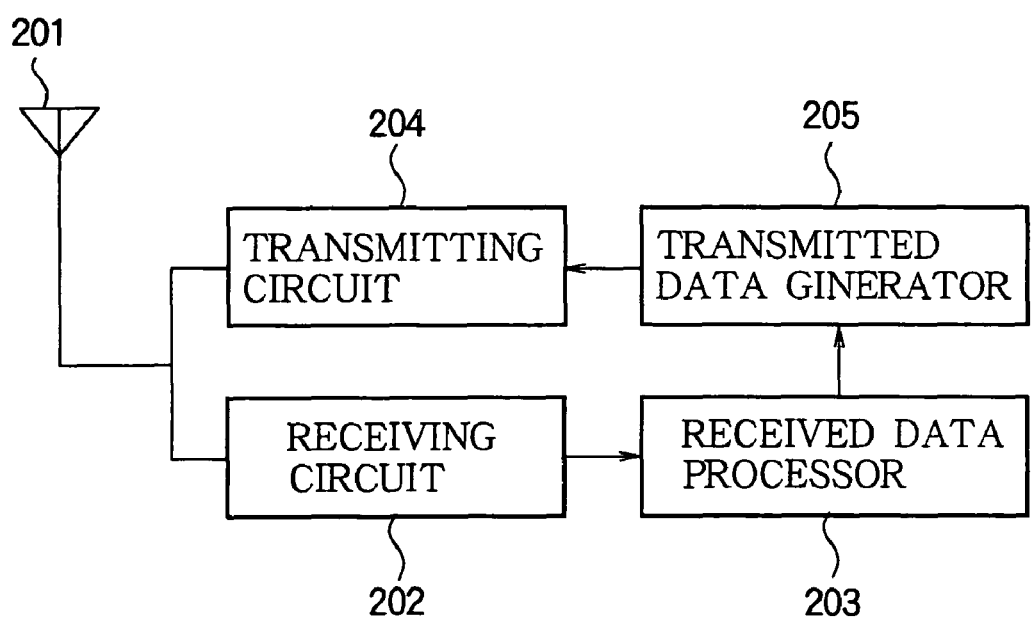
FIG. 2 is a block diagram illustrating the structure of the target device and anchor devices in the first embodiment.

Referring to FIG. 2, the target device 10 and the anchor devices 20 each comprise an antenna 201, a receiving circuit 202, a received data processor 203, a transmitting circuit 204, and a transmitted data generator 205.

The antenna 201 transmits and receives wireless signals. The receiving circuit 202 receives the wireless signals received by the antenna 201, converts them to digital information, and outputs the digital information to the received data processor 203 as received data. At the same time, the receiving circuit 202 measures a physical quantity, such as the received signal power or signal delay of the wireless signal, that can be used to estimate the distance to the transmitting device, and outputs the measured value of the physical quantity to the received data processor 203. The received data processor 203 performs data processing on the received data input from the receiving circuit 202 and instructs the transmitted data generator 205 to create data including necessary information indicating the value measured by the receiving circuit 202 and a transmitting device code (described later) for transmission as an information signal. Acting on the instruction from the received data processor 203, the transmitted data generator 205 generates an the information signal including this necessary information and a receiving device code, which is a unique identification code belonging to the receiving device, and outputs this information signal to the transmitting circuit 204. The transmitting circuit 204 converts the information signal (transmission data) generated in the transmitted data generator 205 to a wireless signal and outputs the wireless signal to the antenna 201.

Figure 3:
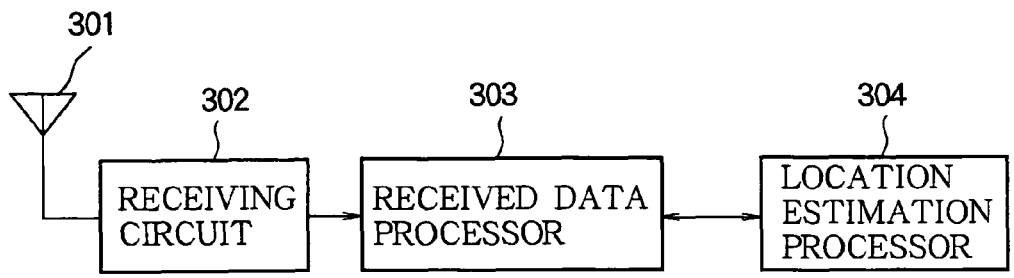
FIG. 3 is a block diagram illustrating the structure of the location estimation apparatus in the first embodiment.

Referring to FIG. 3, the location estimation apparatus 30 comprises an antenna 301, a receiving circuit 302, a received data processor 303, and a location estimation processor 304.

The antenna 301 receives wireless signals. The receiving circuit 302 receives the wireless signals received by the antenna 301, converts them to digital information, and outputs the digital information to the received data processor 303 as received data. The received data processor 303 processes the received data and, if the received data were obtained from an information signal transmitted from a anchor device 20 or the target device 10, outputs the necessary information included in the information signal to the location estimation processor 304. The location estimation processor 304 estimates the location of the target device 10 by operations described below, based on the necessary information.

Next, the operation of the location estimation system in the first embodiment will be described. An example will be described in which device-to-device distances are estimated from the received powers of wireless signals transmitted between the anchor devices 20 and the target device 10. The invention is, however, applicable to any location estimation system that includes a plurality of anchor devices 20 and a target device 10 and can estimate the distance between the target device 10 and each anchor device 20, using any method.

First, each anchor device 20 transmits a location estimation signal to the devices around it. The location estimation signal includes the transmitting device code, which is a unique identification code belonging to the anchor device 20. Information indicating the transmitting power of the location estimation signal may also be included if necessary.

The target device 10 receives the location estimation signal transmitted by each anchor device 20, measures the received power of the location estimation signal, and sends the location estimation apparatus 30 an information signal including the measured received power value, the transmitting device code of the anchor device 20, the receiving device code of the target device 10, and if necessary, the transmitting power value given in the location estimation signal.

When the location estimation apparatus 30 receives this information signal, the receiving circuit 302 decodes the signal and the received data processor 303 extracts the included information. The included information is sent to the location estimation processor 304.

Figure 4:
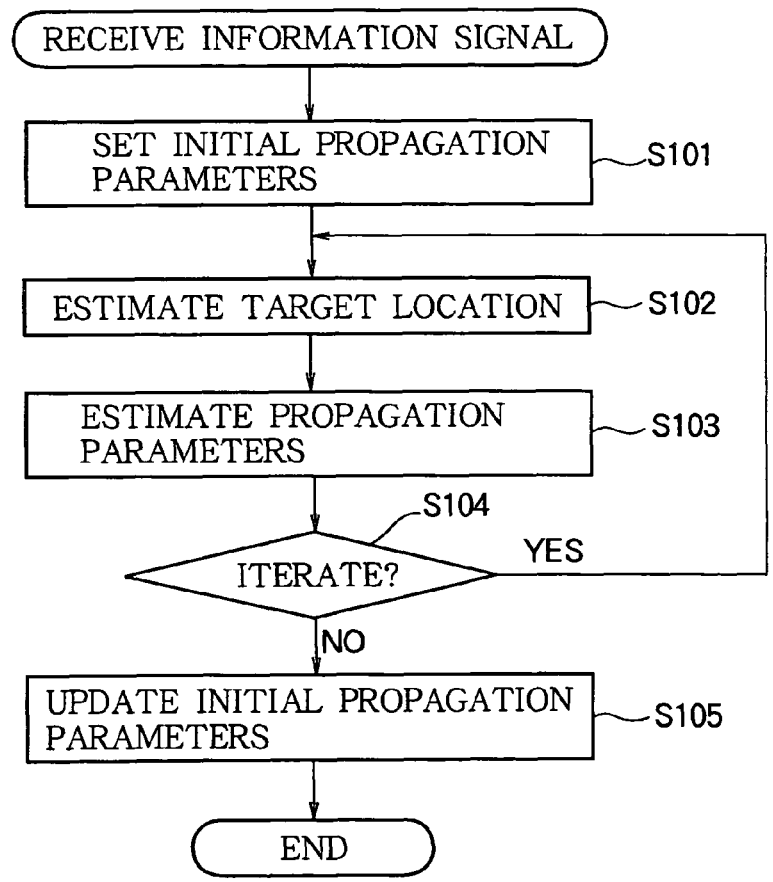
FIG. 4 is a flowchart illustrating the location estimation operation in the first embodiment.

Referring to the flowchart in FIG. 4, when the location estimation processor 304 receives the information extracted by the received data processor 303, it begins by setting initial parameter values that will be used in the location estimation process (S101). These parameters indicate wireless signal propagation characteristics of the location estimation area. The first time the location of the target device 10 is estimated, the parameters are initialized to preset values, but in subsequent location estimates, the initial values may be new values to which the parameters were updated in step S105 (below) of a previous location estimate.

These parameters appear in an equation describing a relationship between received signal power and device-to-device distance (the distance between the target device 10 and an anchor device 20). The parameter values vary depending on the environment and may also vary from time to time even in the same environment, depending on the presence of obstacles. The following is an exemplary equation.

$$P = T \times C \times R^\alpha \tag{1}$$

In the above equation (1), P indicates received signal power, T indicates transmitting power, R indicates the device-to-device distance, and C and $\alpha$ are parameters. The parameter $\alpha$, generally referred as the attenuation coefficient indicates how received signal power varies with distance. The parameter C indicates the attenuation at a specific fixed distance. When there are delayed waves in the signals transmitted and received for location estimation (the location estimation signals), the received signal power and device-to-device distance can be estimated more precisely by estimating the number of delayed waves K and the delay profile D (for example, the attenuation coefficient of each delayed wave) as additional parameters. When a large number of wireless signals are present, it is possible to use a parameter describing a statistical characteristic of the signals, such as a coefficient $\sigma$ describing the variance of the received signal power.

Accordingly, the parameters referred to below are not limited to the two parameters in the above equation (1). In practice there will generally be three or more parameters.

Next, using the set parameter values, the location estimation processor 304 estimates the most likely location of the target device 10, based on the necessary information included in the received information signals and the known locations of the anchor devices 20 (S102). An exemplary maximum likelihood method of estimating the location of the target device 10 will be described below.

Although the above equation (1) expresses an expected relation between device-to-device distance and received signal power, the actual received signal power varies substantially due to multipath fading and other factors. The variations are known to have a specific probability distribution such as the exponential distribution given by the following equation (2).

$$p(P|R)=1/P_{ave} \times \exp(-P/P_{ave}) \qquad (2)$$

In the above equation (2), $P_{ave}$ indicates the average value of the varying received power of a signal transmitted over a given anchor-to-target distance R, and p(P|R) is a probability density value indicating the probability that the actual received signal power will be substantially equal to P.

By assuming an arbitrary anchor-to-target distance R, using the expected value of P given by equation (1) as the average value $P_{ave}$ in equation (2), and using the actual received signal power as the value of P in equation (2), it is possible to calculate the probability density of the actual received signal power, given that the anchor-to-target distance is R. This probability density gives a measure of the likelihood that the target device is actually located at a distance R from the anchor device.

By assuming that the target device 10 is located at an arbitrary point, calculating the distance R from that point to each anchor device, using equations (1) and (2) to calculate the probability density of the actual received power of the signal transmitted by each anchor device 20, and multiplying the resulting probability density values together, it is possible to obtain a value indicating the likelihood that the target device 10 is actually situated at the assumed point. By repeating these calculations for all points in the location estimation area, accordingly, it is possible to find the most likely location of the target device 10.

Instead of checking all possible points in the location estimation area, it is preferable to start by assuming that the target device 10 is present at a certain point, calculate the likelihood of this assumption as described above, and then use an algorithm to search for points with greater likelihoods. There are known algorithms that usually converge quickly on the location of maximum likelihood.

Next, using this estimated location of the target device 10, new values of the parameters are estimated for this location (S103).

In step S102 above, the location having the maximum likelihood is determined in a space in which the values of the parameters are fixed and the anchor-to-target distance R is regarded as a variable. In step S103, the same mathematical techniques (for example, the above equations (1), (2)) are used to find the point of maximum likelihood in a space in which the anchor-to-target distance R is fixed and the values of the parameters are regarded as variables. That is, the parameter values that yield the maximum likelihood are estimated, based on the measured received signal power values and the location of the target device 10 estimated in step S102.

Next, the location estimation processor 304 decides whether or not to iterate (that is, repeat) steps S102 and S103. This decision (S104) is made on the basis of conditions described below. If the location estimation processor 304 decides to repeat steps S102 and S103, when the location of the target device 10 is re-estimated in step S102, the parameter values estimated in step S103 are used. The values of the parameters are then re-estimated, based on the re-estimated location of the target device 10.

The location estimation processor 304 decides to repeat steps S102 and S103 if none of the following conditions is satisfied.

Condition 1: Both the estimated location of the target device 10 and the estimated parameter values have converged. Convergence is recognized when, for example, the differences between the results obtained in steps S102 and S103 and the results obtained in the preceding iteration of steps S102 and S103 are equal to or less than predetermined values.

Condition 2: The number of iterations of steps S102 and S103 has reached a predetermined value.

Condition 3: The likelihood has decreased; that is, the maximum likelihood found in the current iteration is less than the maximum likelihood found in the preceding iteration. (Depending on the type of likelihood function used, a decreased likelihood may be represented by an increased numerical value.)

If one or more of these conditions is satisfied, the location estimation processor 304 decides not to continue iterating steps S102 and S103.

When the decision made in step S104 is not to continue iterating steps S102 and S103, the parameter values obtained in the final iteration (or the penultimate iteration if the likelihood has decreased) are saved (S105) for use as new initial parameter values in step S101 the next time the location of the target device 10 is estimated. If necessary, the received data processor 303 is notified of the estimation results.

If the location estimation process is performed at regular intervals, then in general, the optimum parameter values will not vary greatly from one estimate to the next. Using the parameter values obtained in one estimate as initial parameter values for the next estimate is therefore a way of reducing the number of necessary iterations of steps S102 and S103 in the next estimation process.

The iteration of steps S102 to S104 in the first embodiment has two purposes. One purpose is to estimate the location of the target device 10 more accurately, because the accuracy of the estimate increases during the iterations. The other purpose is to adapt automatically to changes in the layout of the location estimation area and surrounding environment and in temporal factors affecting signal propagation characteristics without requiring a special process to reset the parameters.

In comparison with conventional location estimation systems using the sub-area division method, the following advantages are obtained: no need for a reference device; no need to divide the location estimation area; adaptation to situations in which propagation characteristics change continuously; and no need to re-divide the location estimation area and set the system up again when, for example, the layout of the area is changed.

In a variation of the first embodiment, there are a plurality of target devices 10, each receiving the location estimation signals transmitted by the anchor devices 20. The location of each target device 10 is estimated independently by the process described above.

In another variation of the first embodiment, the target device 10 transmits a location estimation signal to the devices around it, and the anchor devices 20 transmit information signals to the location estimation apparatus 30.

In yet another variation of the first embodiment, the target device 10 includes the location estimation apparatus 30, the anchor devices 20 transmit location estimation signals to the target device 10, and the target device 10 estimates its own location, without transmitting an information signal.

In still another variation of the first embodiment, before sending the location estimation processor 304 the information included in a newly received information signal, the received data processor 303 performs one or both of the following operations (1) and (2).

(1) The received data processor 303 compares the received signal power values or other information used for estimating device-to-device distances in the newly received information signal with the information received in a preceding information signal, which the received data processor 303 stores internally, pertaining to the same target device 10 and anchor device 20, and disregards information that differs significantly from the preceding information. For example, values that differ from the preceding values by more than a predetermined threshold amount may be disregarded.

(2) The received data processor 303 compares the location of each anchor device 20 with the latest estimated position of the target device 10, which the received data processor 303 receives from the location estimation processor 304, and disregards information pertaining to anchor devices 20 that are farther than a predetermined distance from the latest estimated location or are located in a different room or area from the latest estimated location. The received data processor 303 may also disregard information pertaining to an anchor device 20 if the measured received power value of the signal transmitted between that anchor device and the target device 10 differs by more than a predetermined amount from the expected received signal power value calculated from the distance between the anchor device 20 and the estimated location of the target device 10.

These operations (1) and (2) remove unreliable data from the location estimation calculations, thereby further improving the accuracy of the estimated location.

In still another variation of the first embodiment, the received data processor 303 saves the information included in previously received information signals and sends the saved previous information to the location estimation processor 304 when new information is not available for some reason.

Second Embodiment

Instead of estimating the location of each target device 10 independently as in the first embodiment, the second embodiment estimates the locations of a plurality of target devices 10 interdependently.

Figure 5:
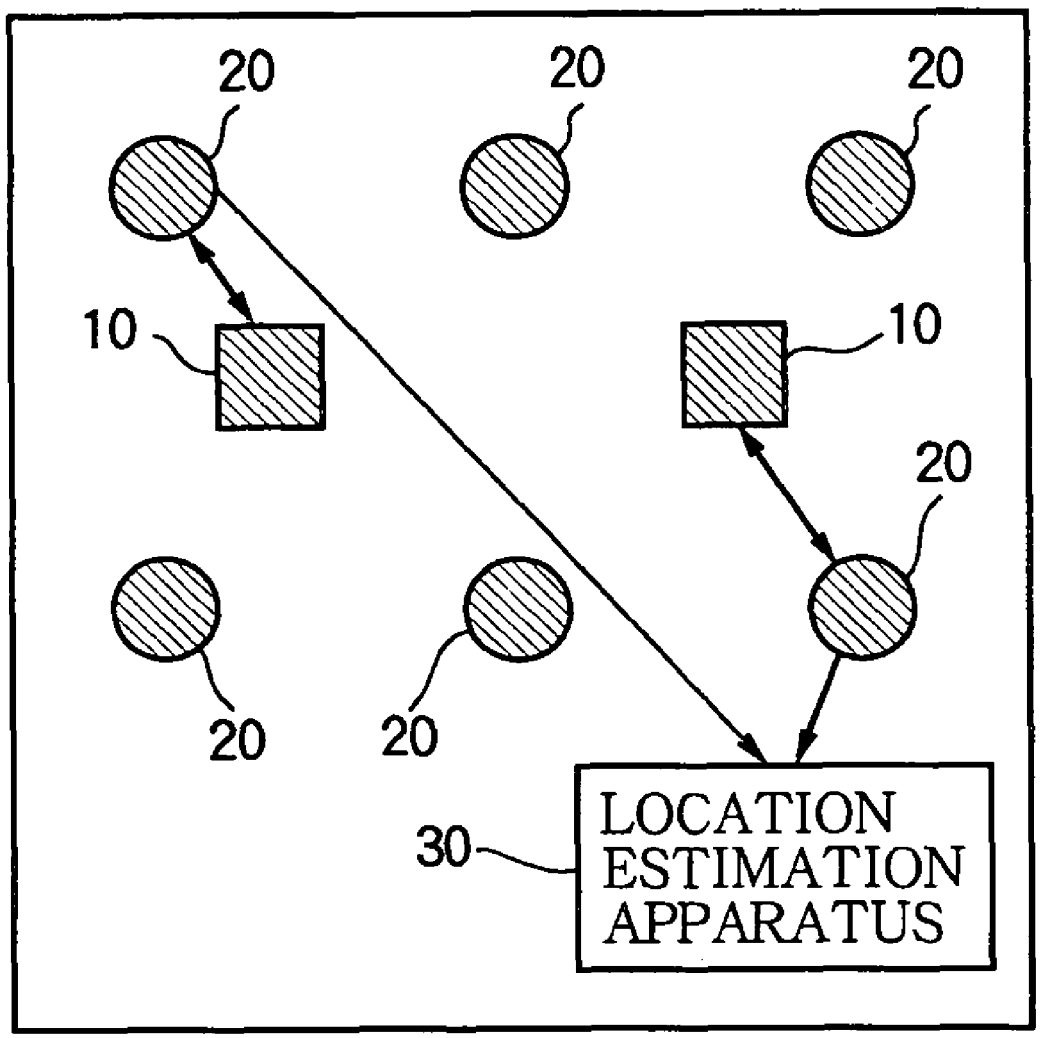
FIG. 5 illustrates the structure of the location estimation system in a second embodiment.

Referring to FIG. 5, the location estimation system of the second embodiment includes a plurality of target devices 10, the locations of which are to be estimated, and a plurality of anchor devices 20. The target devices 10 and anchor devices 20 have the same structure as in the first embodiment, shown in FIG. 2. The location estimation apparatus 30 also has the same structure as in the first embodiment, shown in FIG. 3, but has additional functions for saving information indicating the estimated locations of the target devices 10 and the values of the parameters.

Next, the operation of the location estimation system in the second embodiment will be described. As in the first embodiment, an exemplary method in which received signal power is used for estimating distances will be described, but the second embodiment is applicable to any location estimation system that includes a plurality of anchor devices 20 and a plurality of target devices 10 and can estimate the distances between them by any method.

As in the first embodiment described above, each anchor device 20 transmits a location estimation signal to the devices around it. A target device 10 that has received this signal transmits an information signal including a received signal power value and other necessary information to the location estimation apparatus 30.

Figure 6:
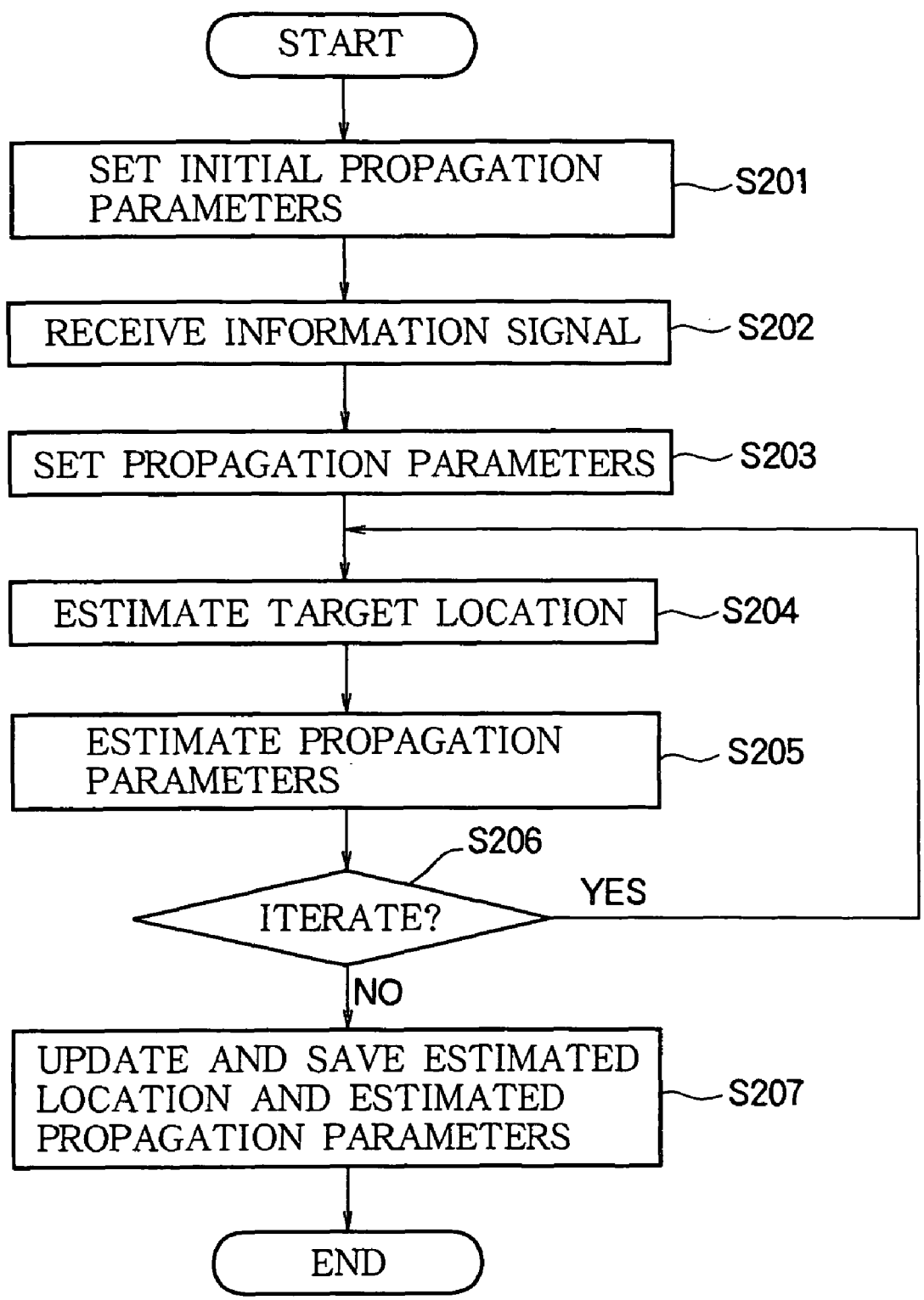
FIG. 6 is a flowchart illustrating the location estimation operation in the second embodiment.

Referring the flowchart in FIG. 6, first the location estimation processor 304 in the location estimation apparatus 30 sets the parameters used for the location estimation calculation to initial values as in the first embodiment (S201). The location estimation apparatus 30 then receives the information signal from the target device 10 (S202) and selects one of three sets of parameter values: the parameter values estimated in the previous location estimation of the same target device 10; the parameter values estimated in the previous location estimation of another target device 10; and the initial parameter values. An exemplary selection method is described below. The location estimation apparatus 30 sets the parameters to the selected parameter values (S203).

The exemplary selection method is based on two selection conditions: existence of a previously estimated location of the relevant target device 10 (first condition); and existence of a more recently estimated location of another target device 10 within a certain area (second condition).

When the second condition is satisfied, it takes priority over the first condition and the parameter values obtained in the location estimation of the other target device 10 are selected.

When only the first condition is satisfied, the parameters obtained in the previous location estimation of the same target device 10 are selected.

When neither the first nor the second condition is satisfied, if estimation results of other target devices 10 are present, the most recently estimated parameter values are selected from among them. Alternatively, if a plurality of sets of estimated parameter values have been obtained within a certain time from the present time, the average values of the parameters may be used. If no estimation results for other target devices 10 are present, the initial parameter values are used.

Alternative selection methods making use of the likelihood values of the previous location estimates may also be employed.

Next, the location estimation processor 304 estimates the location of the target device 10 using the parameters set in step S203 (S204). This step is carried out as described in the first embodiment.

Next, the location estimation processor 304 estimates new parameter values based on the newly estimated location of the target device 10 (S205). This step is also carried out as described in the first embodiment.

Next, the location estimation processor 304 decides whether or not to repeat steps S204 and S205 (S206). This decision is made as described in the first embodiment. If the location estimation processor 304 decides to repeat steps S204 and S205, when the location of the target device 10 is re-estimated in step S204, the parameter values estimated in step S205 are used. The values of the parameters are then re-estimated based on the re-estimated location of the target device 10.

When the decision made in step S206 is not to continue iterating steps S204 and S205, the estimation process is terminated and the estimated location of the target device 10 and the estimated parameter values are saved together with the identification code of the target device 10 and the time at which the estimate was made, for use in later estimations (S207). If necessary, the likelihood values obtained in the estimation process may also be saved, and the received data processor 303 may be notified of the estimation results.

As described above, in the second embodiment, the location estimation processor 304 has a plurality of sets of parameters at its disposal and selects the best available parameter set. One result is that the location of a target device 10 can often be estimated in fewer iterations than in the first embodiment. Another effect is improved estimation accuracy, because the use of better initial parameter values makes it less likely that the estimation process will terminate by reaching the limit number of iterations before the estimated values converge.

In a variation of the second embodiment, when updating and saving the estimated location and parameter values of the target device 10 in step S207, the location estimation processor 304 also saves the likelihood values obtained in the estimation process, indicating the level of certainty of the estimates. The likelihood values are used in the parameter selection step (S203).

When the information indicating a previous location L of the target device 10 estimated at a time T is present, the parameter set having the greatest likelihood value is selected from among the parameter sets that were estimated within a certain range around time T and within a certain area around location L is selected.

When there is no information indicating a previously estimated location of the target device 10, the parameter set having the greatest likelihood value is selected from among the parameter sets estimated within a certain range from the present time.

In yet another variation of the second embodiment, depending on how the parameter values set in step S203 are obtained or on the location of the target device 10 estimated in step S204, the processes in steps S205 and S206 may be omitted and the procedure may jump from step S204 to step S207. This jump may be made, for example, when the location estimated in step S204 is identical to the previously estimated location, or when step S204 is executed using parameter values that were obtained in the previous estimation of the location of another target device 10 and produces the same estimated location as the estimated location of the other target device 10.

Third Embodiment

Instead of estimating the locations of target devices 10¥ on the basis of location estimation signals received from all anchor devices 20¥ as in the preceding embodiments, the third embodiment excludes some of the anchor devices 20¥ to make the estimate more accurate.

The location estimation system in the third embodiment has the same general structure as in the first or second embodiment, shown in FIG. 1 or 5. The target devices 10, the anchor devices 20, and the location estimation apparatus 30 each have the same structure as in the first embodiment, shown in FIGS. 2 and 3.

Next, the operation of the third embodiment will be described. Once again, an exemplary method in which received signal power is used for estimating distances will be described, but the third embodiment can accommodate any method of estimating device-to-device distances.

Although the third embodiment may be based on either the first or the second embodiment, for the sake of generality, the description below will also assume that there are a plurality of target devices 10 as in the second embodiment.

As in the second embodiment, each anchor device 20 transmits a location estimation signal to the devices around it. A target device 10 that has received this signal transmits an information signal including a received signal power value and other necessary information to the location estimation apparatus 30.

Referring to the flowchart in FIG. 7, the location estimation processor 304 in the location estimation apparatus 30 initializes the parameter values (S301), receives an information signal from a target device 10 (S302), selects either the initial parameter values or another set of parameter values (S303), then estimates the location of the target device 10 using the selected parameter values (S304), estimates new parameter values based on the estimated location of the target device 10 (S305), iterates steps S304 and S305 until a first stopping condition is satisfied (S306), and saves the final estimated location of the target device 10 and the newest parameter values (S307). These steps are similar to steps S201 to S207 in the second embodiment.

Step S307 may also include the saving of likelihood values for later use in steps S303 and S308.

Next, the location estimation processor 304 decides whether or not to accept the estimated location. If the location estimation processor 304 decides to accept the estimated location, it deletes an unused device list, described below, and the process ends. If the location estimation processor 304 decides not to accept the estimated location, it proceeds to step S309, adds one anchor device 20 to the unused device list, and then repeats steps S304 to S308 without using the information pertaining to the anchor devices 20 on the unused device list.

In step S308, the location estimation processor 304 decides to accept the estimated location when at least one of the following conditions is satisfied: the number of anchor devices 20 in the unused device list has reached a predetermined number; the number of anchor devices 20 not yet added to the unused device list (the number of anchor devices 20 still in use) has reached a predetermined number; the likelihood of the estimated location, normalized according to the number of anchor devices 20 still in use, has decreased as compared with the previous execution of step S308; or the estimated locations have converged (for example, the difference between the currently estimated location and the estimated location at the previous execution of step S308 is equal to or less than a predetermined value).

When the location estimation processor 304 decides not to accept the location estimate, in step S309 it selects one of the anchor devices 20 still in use by, for example, the algorithm described below. The location estimation processor 304 then deletes the information pertaining to the selected anchor device 20 from the information it has obtained from the current information signal and the information it has saved earlier. Alternatively, instead of deleting the information, the location estimation processor 304 may mark the information by adding an identifier or flag, and not use such marked information in the subsequent estimation processes.

The exemplary selection algorithm used in this embodiment calculates the distance D from the currently estimated location of the target device 10 to each anchor device 20, derives the most likely distance R to the anchor device 20 from the received signal power value and equation (1), for example, calculates the absolute difference between R and D, and selects the anchor device 20 for which this absolute difference (|R−D|) has the maximum value. In other words, the anchor device 20 giving the received signal power value most inconsistent with the estimated location is added to the unused device list.

In a variation of the third embodiment, instead of adding just one anchor device 20 at a time to the unused device list, the location estimation processor 304 may select a plurality of anchor devices 20 and add them all at once to the unused device list.

In another variation of the third embodiment, instead of just adding anchor devices 20 to an unused device list, the location estimation processor 304 may both add anchor devices 20 to the unused device list and remove anchor devices 20 from the unused device list in order to re-estimate the location of the target device 10 with various combinations of unused anchor devices 20.

In the third embodiment, steps S304 to S309 are iterated until one of the stopping conditions in step S308 is satisfied, and the estimated location obtained in the last iteration, or the penultimate iteration if the normalized likelihood has decreased, is output as the final estimated location.

By adding selected anchor devices 20 to the unused device list, the third embodiment can refine the estimation process by excluding anchor devices 20 for which the estimated parameter values seem inapplicable and using only anchor devices 20 for which the estimated parameter values work well. The accuracy of the estimated location is thereby improved. When the location estimation is based on received signal power, estimation accuracy can be improved by excluding an anchor device 20 if the transmission path between the anchor device 20 and the target device 10 is blocked by the object to which the target device 10 is attached, or by an intermediate object such as a pillar, and by excluding an anchor device 20 if for some reason its transmitted output differs from the expected output.

A few exemplary embodiments and variations have been described above, but those skilled in the art will recognize that further embodiments and variations are possible within the scope of the invention, which is defined in the appended claims.

What is claimed is:

1. A method of estimating the location of a target device by using a parameter indicating a signal propagation characteristic of a location estimation area in which the target device and a plurality of anchor devices deployed at known locations transmit and receive wireless signals, comprising:
   determining an estimated location of the target device based on necessary information obtained from the wireless signals transmitted and received by the target device and the plurality of anchor devices and on the known locations of the plurality of anchor devices, by using the parameter;
   estimating a new value of the parameter from the necessary information, the known locations of the plurality of anchor devices, and the estimated location of the target device; and
   using the new value of the parameter in a subsequent estimation of the location of the target device.

2. The method of claim 1, wherein the method is used to estimate the locations of a plurality of target devices one at a time, further comprising using the new value of the parameter obtained by estimating the location of one of the target devices in a subsequent estimation of the location of another one of the target devices.

3. The method of claim 1, further comprising iterating the determining of the estimated location and the estimating of the new value until a first stopping condition is satisfied.

4. The method of claim 3, further comprising:
   selecting a reduced set of the anchor devices;
   re-iterating the determining of the estimated location and the estimating of the new values until the first stopping condition is satisfied; and
   repeating said selecting and said re-iterating until a second stopping condition is satisfied.

5. A location estimation system comprising:
   a target device for transmitting and receiving wireless signals in a location estimation area;
   a plurality of anchor devices deployed at known locations in the location estimation area, for receiving and transmitting the wireless signals; and
   a location estimation apparatus for estimating a location of the target device by using a parameter indicating a signal propagation characteristic of the location estimation area, wherein the location estimation apparatus:
   determines an estimated location of the target device based on necessary information obtained from the wireless signals transmitted and received by the target device and the anchor devices, the known locations of the plurality of anchor devices, and the parameter;
   estimates a new value of the parameter from the necessary information obtained from the wireless signals transmitted and received by the target device and the anchor devices, the known locations of the plurality of anchor devices, and the estimated location of the target device; and
   uses the new value of the parameter in a subsequent estimation of the location of the target device.

6. The location estimation system of claim 5, wherein the location estimation apparatus, after estimating the new value of the parameter, again determines the estimated location of the target device, using the new value of the parameter, and then again estimates the new value of the parameter, using the again-determined estimated location of the target device.

7. A location estimation system, comprising
   a target device for transmitting and receiving wireless signals in a location estimation area;
   a plurality of anchor devices deployed at known locations in the location estimation area, for receiving and transmitting the wireless signals; and
   a location estimation apparatus for estimating a location of the target device by using a parameter indicating a signal propagation characteristic of the location estimation area, wherein
   the location estimation apparatus:
   determines an estimated location of the target device based on necessary information obtained from the wireless signals, the known locations of the plurality of anchor devices, and the parameter;
   estimates a new value of the parameter from the necessary information, the known locations of the plurality of anchor devices, and the estimated location of the target device; and
   uses the new value of the parameter in a subsequent estimation of the location of the target device;
   the location estimation apparatus, after estimating the new value of the parameter, again determines the estimated location of the target device, using the new value of the parameter, and then again estimates the new value of the parameter, using the again-determined estimated location of the target device; and
   the location estimation apparatus iterates the determining of the estimated location of the target device and the estimating of the new value of the parameter repeatedly until a first stopping condition is satisfied.

8. The location estimation system of claim 7, wherein the first stopping condition is satisfaction of at least one of the following conditions: convergence of the estimated location of the target device; a decrease in likelihood of the estimated location of the target device; completion of a predetermined number of determinations of the estimated location of the target device.

9. The location estimation system of claim 5, wherein the location estimation apparatus saves the necessary information and disregards newly obtained necessary information if the newly obtained necessary information differs by more than a predetermined amount from the saved necessary information.

10. The location estimation system of claim 9, wherein the location estimation apparatus saves the estimated location of the target device and disregards newly obtained necessary information pertaining to one of the anchor devices according to the distance from the one of the anchor devices to the saved estimated location of the target device.

11. The location estimation system of claim 5, wherein the location estimation apparatus saves the necessary information and uses the saved necessary information when new necessary information cannot be obtained from any one of the plurality of anchor devices or the target device.

12. The location estimation system of claim 5, comprising a plurality of target devices, said target device being one of the plurality of target devices, wherein the location estimation apparatus:
   saves the new value of the parameter estimated when the estimated location the target device is determined; and
   uses the saved new value of the parameter to estimate the location of another one of the plurality of target devices.

13. The location estimation system of claim 12, wherein the location estimation apparatus:
   separately saves the new values of the parameter estimated when the estimated location of each one of the plurality of target devices is determined;
   also saves likelihood values indicating a level of certainty of the estimated location of each one of the plurality of target devices;
   uses the saved likelihood values to select one of the saved new values of the parameter; and
   uses the selected saved new value of the parameter to estimate the location of the target device.

14. The location estimation system of claim 5, wherein the location estimation apparatus:
   selects one or more anchor devices among the plurality of anchor devices as unused devices; and
   disregards the necessary information obtained from the wireless signals transmitted and received by the unused devices in estimating the location of the target device.

15. The location estimation system of claim 14, wherein the location estimation apparatus:
   determines the estimated location of the target device and estimates the new value of the parameter repeatedly, changing the one or more anchor devices selected as unused devices at each repetition, until a second stopping condition is satisfied.

16. The location estimation system of claim 5, wherein the location estimation apparatus:
   uses the parameter to calculate distances from the target device to the plurality of anchor devices;
   also uses the parameter to calculate, for an arbitrary location of the target device, a likelihood of obtaining the necessary information obtained from the wireless signals transmitted and received by the target device and the plurality of anchor devices; and
   selects a location that maximizes the calculated likelihood as the estimated location of the target device.

17. A wireless device operating as one of the location estimation apparatus, the target device, and the plurality of anchor devices in the location estimation system of claim 5.

18. A wireless device comprising including the location estimation apparatus of the location estimation system in claim 5, the wireless device operating as the target device.

19. The method of claim 1, wherein the wireless signals transmitted and received by the target device and the plurality of anchor devices include wireless signals transmitted from the target device and received by the anchor devices, and wireless signals transmitted from the anchor devices and received by the target device.

20. The location estimation system of claim 5, wherein the location estimation apparatus estimates the new value of the parameter from the necessary information obtained from the wireless signals transmitted from the target device and received by the anchor devices, and from the wireless signals transmitted from the anchor devices and received by the target device.

* * * * *